United States Patent Office 3,254,944
Patented June 7, 1966

3,254,944
PROCESS FOR PREPARING CHLORODIFLUORO-AMINE AND TETRAFLUOROHYDRAZINE
Emil A. Lawton, Woodland Hills, and David F. Sheehan, Canoga Park, Calif., assignors to North American Aviation Inc.
No Drawing. Filed Dec. 20, 1961, Ser. No. 161,342
11 Claims. (Cl. 23—14)

This invention relates to the preparation of compounds containing nitrogen-to-fluorine bonds. More particularly, the present application is directed to a method for the preparation of chlorodifluoramine in which tetrafluorohydrazine may be produced.

Chlorodifluoramine is a compound which is used as a starting compound for the preparation of NF-compounds such at tetrafluorohydrazine, a very high energy oxidizer. Chlorodifluoramine is also used in the preparation of other oxidizers and monopropellants. In the prior art, chlorodifluoramine has been prepared by the reaction of difluoramine with boron trichloride at low temperatures. This constitutes an expensive process because of the high cost of the latter chemical and the relatively low yield.

Tetrafluorohydrazine has been reported in the Journal of the American Chemical Society, volume 80, at page 5004 (1958). It was prepared by the reaction of $NF_3$ with metals at temperatures of 350° to 450° C. in the presence of such metals as copper and arsenic. The compound finds utility in the propellant arts and as a chemical intermediate.

It is, therefore, an object of this invention to provide a process for the preparation of both chlorodifluoramine and tetrafluorohydrazine. It is a further object of this invention to provide a process for the preparation of these compounds in high yield from easily handled starting materials. Additional objects will become apparent from the following description of the invention.

The objects of the present invention are accomplished by a process which comprises reacting either N,N-difluorourea or a fluorinated urea liquid (prepared from urea and gaseous fluorine) with a chlorinating agent.

The chlorinating agent employed in the process of this invention is an inorganic chlorine containing compound selected from the class consisting of chlorine, hydrogen chloride, hypochlorous acids, the alkali and alkaline earth salts of hypochlorous acid, and carbonyl chloride, and mixtures of these reagents.

In one embodiment of the invention, the fluorinated urea or N,N-difluorourea is reacted with an acid hypochlorite to recover both chlorodifluoramine and tetrafluorohydrazine as the reaction products. Since both chlorodifluoramine and tetrafluorohydrazine are gases under ordinary conditions, the gaseous reaction products are collected and condensed at low temperature to obtain the desired products.

In another embodiment, hypochlorous acid is reacted with N,N-difluorourea or fluorinated urea liquid under basic conditions. The hypochlorite employed in this embodiment is ordinarily added to the fluorinated urea starting material as a basic solution. Any strong base may be employed to create the basic conditions. However, the alkali metal hydroxides are preferred bases for use in the aspect of the invention. It is also possible to react the fluorinated urea starting material wtih hypochlorous acid under essentially neutral conditions.

In another embodiment of the invention fluorinated urea liquid or N,N-difluorourea is reacted with carbonyl chloride to produce chlorodifluoramine.

In still another embodiment of the invention fluorinated urea liquid or N,N-difluorourea may be reacted directly with chlorine. This reaction may be conducted with chlorine gas itself or an aqueous solution containing chlorine as the reactive species. When employing aqueous chlorine, the chlorinating agent may be prepared by dissolving chlorine and hydrogen chloride in water, or alternately, chlorine, an alkali metal hypochlorite with or without acid may be used to supply the chlorinating agent.

In still another embodiment, N,N-difluorourea or fluorinated urea liquid is reacted with hydrogen chloride either as a pure compound or as hydrochloric acid to produce chlorodifluoramine.

In all of the above embodiments of the invention the reaction times, temperatures, and recovery procedures are substantially the same. Generally speaking, reaction temperatures between −30° C. and 60° C. or higher may be employed. However, preferred reaction temperatures are in the range of 0° C. to 30° C. since these temperatures are ordinarily employed in the distillation and recovery of chlorodifluoramine produced by the reaction.

As noted above, the reaction between the chlorinating agent and N,N-difluorourea may be conducted in an aqueous system. However, the reaction may also be conducted in the absence of a solvent as when reacting chlorine gas with fluorinated urea liquid. Other solvents may be employed in the process of this invention. Preferred solvents which are good solvents for N,N-difluorourea include partially halogenated hydrocarbons, cyclic ethers, and alkyl ethers. When a partially halogenated hydrocarbon is employed, it preferably has from 1 to 5 carbon atoms and is preferably a halogenated alkane which is a liquid in some portion of the temperature range employed in the reaction. These partially halogenated alkane compounds include methylchloride, methylbromide, dichloromethane, dibromoethane, difluoromethane, chloroform, ethylbromide, ethylchloride, ethyliodide, 1,1-dichloroethane, 1,1-difluoroethane, 2-bromopropane, 2-chloropropane, 1-chloro-2-methylbutane, tert-amylfluoride, 1-fluorobutane, 1-chlorobutane, 2-chlorobutane, 2-chloro-2-methylpropane, and the like. Dichloromethane is a preferred solvent since N,N-difluorourea is extremely soluble in this solvent.

The cyclic ethers applicable to the process of this invention are cyclic compounds having 5 or 6 ring atoms including one or more oxygen atoms, the remainder being carbon atoms, thus, tetrahydrofuran, tetrahydropyran, m-dioxane, p-dioxane, and the like may be employed in the process of this invention. A preferred solvent of the cyclic ether type is tetrahydrofuran, as it has been found that N,N-difluorourea is also extremely soluble in this compound.

The alkyl ethers applicable to the process of this invention are lower alkyl ethers which, in general, have up to about 8 carbon atoms in the molecule. They have the formula R—O—R', wherein R and R' are alkyl hydrocarbon groups having from 1 to 7 carbon atoms. The preferred ethers are those having from 4 to 6 carbon atoms and diethyl ether is the most particularly preferred solvent in this class. Other examples of alkyl ethers applicable to this invention are dimethyl ether, ethylmethyl ether, di-n-propyl ether, and dibutyl ether.

The reaction between difluorourea or fluorinated urea liquid and a chlorinating agent is preferably conducted by adding incremental portions of the chlorinating agent to the fluorinated urea reactant. Ordinarily an excess of chlorinating agent is employed to insure maximum utilization of the fluorinated urea reagent. The chlorinating agent is added to the fluorinated urea in order to prevent the reaction from becoming too strongly acid or too strongly basic, since undesirable side reactions are encountered at extremely high and low hydrogen ion concentration during the reaction. For example, when a hypochlorite reagent which is acidic to any great degree is in excess during the reaction, the predominant reaction product may be difluoramine rather than the desired chlorodifluoramine. On the other hand, if the reaction is allowed to become too strongly basic, the starting material may decompose to difluorodiazine.

However, in one embodiment of the invention it is possible to prepare either tetrafluorohydrazine or chlorodifluoramine to the relatively complete exclusion of the other product by adjusting the acidity of the chlorinating agent. When hypochlorite is employed as the chlorinating agent, basic conditions lead to very good yields of tetrafluorohydrazine while acid conditions tend to make the reaction produce chlorodifluoramine in good yield to the relative exclusion of tetrafluorohydrazine.

Thus, the chlorinating agent may be added to the fluorinated urea product over a period of from 15 minutes to 24 hours or longer, depending upon the relative quantities of starting materials employed, and the efficiency of distribution of the chlorinating agent through the reaction vessel. Ordinarily, however, it is preferred to conduct the reaction over a period of from 15 minutes to 1 hour.

Various side reactions occur in the preparation of chlorodifluoramine and tetrafluorohydrazine by the chlorination of N,N-difluorourea or fluorinated urea liquid. When the reaction is conducted in glass apparatus some silicon tetrafluoride may be produced. In addition, carbon dioxide, nitrosyl chloride, nitrogen dioxide, nitric oxide and gaseous starting materials may be present in the gaseous reaction product.

These impurities may be removed from the desired reaction product by condensation through a series of cold traps in a relatively high vacuum system. For example, chlorodifluoramine and tetrafluorohydrazine ordinarily condense under vacuum conditions in a trap cooled to $-156°$ C. while carbon dioxide, $NO_2$, and chlorine will all condense in a trap cooled to the $-142°$ C. Thus the gaseous reaction products may be passed through a series of traps at $-142°$ C. and $-156°$ C. Nitric oxide is not condensable at these temperatures and will pass from the system. Silicon tetrafluoride may be removed from the reaction product by adding an alkali metal fluoride to the residue in the trap cooled to $-156°$ C. followed by sublimation and recondensation of the product at $-156°$ C. The silicon tetrafluoride will not sublime under these conditions since it forms a complex with the alkali metal fluoride. When both chlorodifluoramine and tetrafluorohydrazine have been produced by the reaction, they may be separated by partition chromatography from a column packed with solid polychlorotrifluoroethylene and polychlorotrifluoroethylene oil as the stationary liquid phase.

The N,N-difluorourea and fluorinated urea liquid employed as starting materials in the process of this invention may be prepared by reacting urea with fluorine gas at temperatures ranging generally from $-30°$ C. to above room temperature. The process for preparing fluorinated urea liquid is more fully described in the patent application, Serial No. 840,066, filed September 15, 1959, for Emil A. Lawton et al. and entitled, "Method of Preparing Difluoramine and Preparing Tetrafluorohydrazine Therefrom." Difluorourea may be recovered from the fluorinated urea liquid by fractionation or solvent extraction as disclosed respectively in application, Serial No. 103,512, filed April 17, 1961, by Emil A. Lawton et al., and entitled, "Fluorine Containing Compounds," and application, Serial No. 103,255, filed April 17, 1961, by Michael G. Warner et al., and entitled "Chemical Process," now abandoned.

As used throughout the specification, the term "active fluorine" means the amount of available fluorine in a given quantity of compound or mixture which will oxidize an acid solution of potassium iodide. In the examples which follow, percent of active fluorine is calculated from the amount of fluorine employed in preparing fluorinated urea liquid.

The following examples illustrate the process of this invention.

*Example 1*

A fluorinated urea liquid was prepared according to the method described in application, Serial No. 840,066, filed September 15, 1959, by E. A. Lawton et al., entitled, "Method of Preparing Difluoramine and Preparing Tetrafluorohydrazine Therefrom." A portion of this fluorinated urea product (860 parts) was passed in a glass reactor and attached to a vacuum line. Air was removed from the system and approximately 250 parts of 10 percent sodium hypochlorite solution was added slowly to the fluorinated urea liquid. Condensable gases evolved by the reaction were recovered through a series of cold traps. The trapped gases were identified by I.R. as chlorodifluoramine, tetrafluorohydrazine, and nitrosyl chloride.

*Example 2*

In a reaction vessel equipped with heating and cooling means, means for admitting and discharging liquid and gaseous materials, and means for agitating the contents thereof, is placed 10 parts of N,N-difluorourea. The vessel is attached to a vacuum system and maintained separate from the vacuum line while 51 parts of tetrahydrofuran are added to the vessel to dissolve the difluorourea. The vessel is then evacuated and 21 parts of a basic hypochlorite solution prepared from sodium hypochlorite and sodium hydroxide are added to the vessel while the contents thereof are agitated. The addition of the basic hydrochloride is adjusted so that the entire quantity of hypochlorite is added to the solution over a two hour period while the reaction is maintained at $60°$ C. Condensable gases produced by the reaction are collected in cold traps in the vacuum line at temperatures of $-126°$ C., $-156°$ C., and $-196°$ C. A high yield of essentially pure tetrafluorohydrazine is collected in the trap cooled to $-156°$ C.

*Example 3*

The procedure of Example 2 is repeated using 12 parts of a fluorinated urea liquid having 32 percent active fluorine content. The reaction is conducted in the absence of a solvent at $30°$ C. and produces an excellent yield of tetrafluorohydrazine.

*Example 4*

Following the general procedure outlined in Example 2 above, 10 parts of fluorinated urea liquid are mixed with 50 parts of diethyl ether and charged to the reaction vessel and reacted with 22 parts of a basic hypochlorite solution prepared from 20 parts of water, 11 parts of sodium hypochlorite, and 13 parts of hydrochloric acid. The hypochlorite solution is added to the fluorinated urea liquid over a four hour period while the reaction vessel is maintained at $20°$ C. An excellent yield of chlorodifluoramine is recovered in the trap cooled to $-156°$ C.

*Example 5*

Following the general procedure of Example 2, 5 parts of difluorourea dissolved in 21 parts of 1,1-dichloroethane are reacted with 53 parts of a 10 percent solution of hypochlorous acid added to the difluorourea slowly over an 8 hour period at a temperature of about $10°$ C. The reaction produces a mixture of tetrafluorohydrazine and chlorodifluoramine in good yield.

*Example 6*

To the reaction vessel described in Example 2 is added 100 parts of N,N-difluorourea dissolved in 300 parts of m-dioxane. 200 parts of hydrogen chloride gas are passed through the reaction vessel over a 6 hours period. The reaction is conducted at $35°$ C. A high yield of essentially pure chlorodifluoramine is collected in the trap cooled to $-156°$ C.

Example 7

The procedure of Example 6 is followed employing 16 parts of fluorinated urea liquid having active fluorine content of 30 percent. Concentrated aqueous hydrochloric acid is employed as the chlorinating agent in lieu of hydrogen chloride gas. The reaction which is conducted at 20° C., produces a high yield of chlorodifluoramine.

Example 8

Carbonyl chloride (13 parts) is reacted with 11 parts of N,N-difluorourea dissolved in 57 parts of dichloromethane according to the procedure of Example 6. The contents of the reaction vessel are maintained at 0° C. during the addition of the carbonyl chloride. The carbonyl chloride is added slowly to the reaction vessel over a 2 hour period and chlorodifluoramine is obtained in the trap cooled to −156° C.

Example 9

The procedure of Example 8 is followed employing 12 parts of a fluorinated urea liquid having 31 percent active fluorine. Chlorodifluoramine is the main product of the reaction.

Example 10

Following the procedure of Example 6, 125 parts of chlorine gas are reacted with N,N-difluorourea at a temperature of −30° C. over a 1 hour period. Chlorodifluoramine in good yield is collected in the trap cooled to −156° C.

The process of this invention has several outstanding advantages. Unlike difluoramine, fluorinated urea liquid is sensitive to shock only under extreme conditions. N,N-difluorourea is, likewise, much less shock sensitive than difluoramine. Difluoramine, on the other hand, is extremely shock-sensitive and explodes with violence. Thus the process of this invention has the advantage of producing much higher yields of product without resort to explosive starting materials.

Chlorodifluoramine also reacts with amines to produce tetrahydrazine as shown in the following examples.

Example 11

To an evacuated reaction vessel equipped with inlet and outlet means, heat and cooling means, pressure and measuring means, were added 6.5 parts by volume of chlorodifluoramine and 11 parts by volume of dimethylamine dissolved in 20.8 parts dimethyl ether while maintaining the reaction vessel at temperatures within the range of −142° C. to about 25° C. The components were next allowed to stand at 25° C. for a period of 18 hours during which time a white solid was formed in the liquid phase. The contents of the vessel were then fractionated and analyzed. The solid was found to be mainly dimethylamine hydrochloride. No alkylated hydrazines were present. The fractionation of the volatile products produced ether, 2.3 parts by volume of unreacted amine and 3.2 parts by volume of tetrafluorohydrazine.

Example 12

The procedure of Example 11 was repeated with the modification that diethyl ether was substituted for dimethyl ether and the temperature was maintained at −80° C., or lower, during the reaction period. It was found that the ClNF$_2$ was nearly quantitatively converted to N$_2$F$_4$.

Example 13

In the apparatus described above, 12.5 parts by volume of dimethylamine was reacted with 4 parts by volume of N$_2$F$_4$ in the vapor phase at substantially 80° C. for a period of approximately 2 hours. The products upon analysis were found to be methylazide and smaller amounts of diazomethane and azomethane.

Diazomethane is widely used in chemical syntheses.

We claim:

1. A process for the preparation of chlorodifluoramine which comprises reacting a chlorinating agent with a material selected from the class consisting of N,N-difluorourea and a fluorinated urea liquid prepared from urea and fluorine.

2. The process which comprises reacting N,N-difluorourea with a chlorinating agent, and recovering at least one product of the group consisting of chlorodifluoramine and tetrafluorohydrazine.

3. The process which comprises reacting a fluorinated urea liquid, prepared from urea and gaseous fluorine, with a chlorinating agent, and recovering at least one product of the group consisting of chlorodifluoramine and tetrafluorohydrazine.

4. The process for the preparation of chlorodifluoramine which comprises reacting N,N-difluorourea with a chlorine supplying reagent under conditions whereby N,N-difluorourea is simultaneously chlorinated and disproportionated to produce chlorodifluoramine.

5. A process for the preparation of chlorodifluoramine which comprises reacting N,N-difluorourea with a chlorinating agent selected from the class consisting of chlorine, hydrogen chloride, hydrochloric acid, carbonyl chloride, hypochlorous acid, and aqueous hypochlorite.

6. A process for the preparation of tetrafluorohydrazine which comprises reacting difluorourea with sodium hypochlorite under basic conditions.

7. The process for the preparation of chlorodifluoramine and tetrafluorohydrazine which comprises reacting a hypochlorite solution with N,N-difluorourea.

8. The process for the preparation of chlorodifluoramine and tetrafluorohydrazine which comprises (a) reacting urea with elemental fluorine to prepare a fluorinated urea liquid and (b) reacting said fluorinated urea with a hypochlorite solution.

9. A process for the preparation of chlorodifluoramine which comprises reacting difluorourea with anhydrous hydrogen chloride.

10. The process for the preparation of chlorodifluoramine which comprises reacting difluorourea with carbonyl chloride.

11. A process for the preparation of chlorodifluoramine which comprises reacting, at temperatures from −30 to 60° C., a compound selected from the class consisting of N,N-difluorourea and a fluorinated urea liquid prepared from urea and gaseous fluorine, with a chlorinating agent selected from the class consisting of chlorine, hydrogen chloride, hydrochloric acid, carbonyl chloride, hypochlorous acid, and aqueous hypochlorite, recovering gases produced by the reaction and condensing said gases under vacuum at a temperature of about −156° C. to recover chlorodifluoramine.

References Cited by the Examiner

UNITED STATES PATENTS 2,878,288  3/1959  Levine _____ 260—533

BENJAMIN HENKIN, *Primary Examiner.*

CARL D. QUARFORTH, *Examiner.*